US008181733B2

(12) United States Patent
Locati et al.

(10) Patent No.: US 8,181,733 B2
(45) Date of Patent: May 22, 2012

(54) MOTORCYCLE EQUIPPED WITH AN EXHAUST GAS PURIFYING APPARATUS WITH IMPROVED LAYOUT

(75) Inventors: Claudio Locati, Milan (IT); Alessandro Ghezzi, Milan (IT); Toshiharu Shigeta, Milan (IT)

(73) Assignee: Yamaha Motor Europe N.V., Schiphol-Rijk (NL)

( * ) Notice: Subject to any disclaimer, the term of this patent is extended or adjusted under 35 U.S.C. 154(b) by 262 days.

(21) Appl. No.: 12/684,138

(22) Filed: Jan. 8, 2010

(65) Prior Publication Data

US 2010/0187036 A1   Jul. 29, 2010

(30) Foreign Application Priority Data

Jan. 26, 2009   (EP) .................................... 09001041

(51) Int. Cl.
    *B60K 13/04* (2006.01)
(52) U.S. Cl. ......... 180/309; 180/227; 180/219; 180/225
(58) Field of Classification Search .................. 180/309, 180/227, 219, 225
    See application file for complete search history.

(56) References Cited

U.S. PATENT DOCUMENTS

| | | | | |
|---|---|---|---|---|
| 4,475,622 A * | 10/1984 | Tsunoda et al. | ............. | 181/227 |
| 5,016,725 A * | 5/1991 | Muramatsu | ................... | 180/225 |
| 6,920,949 B2 * | 7/2005 | Matsuura et al. | ............ | 180/68.2 |
| 7,156,199 B2 * | 1/2007 | Takano | ......................... | 180/309 |
| 7,568,548 B2 * | 8/2009 | Fujii et al. | ..................... | 180/309 |
| 7,712,756 B2 * | 5/2010 | Seki et al. | ..................... | 280/272 |
| 8,033,357 B2 * | 10/2011 | Nishijima | ..................... | 180/296 |
| 2004/0178012 A1 * | 9/2004 | Takano | ......................... | 180/227 |
| 2004/0206565 A1 * | 10/2004 | Nagashii et al. | ............. | 180/219 |
| 2008/0060864 A1 * | 3/2008 | Arai | .............................. | 180/219 |
| 2010/0018792 A1 * | 1/2010 | Arnold | ......................... | 180/219 |
| 2011/0192669 A1 * | 8/2011 | Yokoi et al. | .................. | 180/219 |

FOREIGN PATENT DOCUMENTS

| | | |
|---|---|---|
| EP | 1 449 754 A2 | 8/2004 |
| EP | 1 614 613 A2 | 1/2006 |
| EP | 1 908 678 A2 | 4/2008 |
| JP | 2005-188316 A | 7/2005 |
| JP | 2008-94161 A | 4/2008 |

OTHER PUBLICATIONS

Official Communication issued in counterpart European Patent Application No. 09001041.4, mailed on Jul. 2, 2009.

* cited by examiner

*Primary Examiner* — Joanne Silbermann
*Assistant Examiner* — Marlon Arce
(74) *Attorney, Agent, or Firm* — Keating & Bennett, LLP

(57) ABSTRACT

An exhaust pipe includes a catalyst housing portion arranged to be at least partially positioned in a space disposed between a shock absorber and a rear wheel, and a catalyst is disposed in the catalyst housing portion.

8 Claims, 11 Drawing Sheets

MOTORCYCLE EQUIPPED WITH AN EXHAUST GAS PURIFYING APPARATUS WITH IMPROVED LAYOUT

BACKGROUND OF THE INVENTION

1. Field of the Invention

The present invention relates to an exhaust gas purifying apparatus for a motorcycle and a motorcycle equipped with such an exhaust gas purifying apparatus. More particularly, the present invention relates to an exhaust gas purifying apparatus having an improved layout of one or more catalysts.

2. Description of the Related Art

It is well known that nowadays motorcycles with combustion engines have to be equipped with catalysts so as to comply with anti-pollution rules and/or requirements. The catalysts are located inside the main exhaust gas pipe and function to collect and trap the pollutants contained in exhaust gases, thus allowing only permitted substances to be emitted and dispersed into the atmosphere. Accordingly, many efforts have been dedicated over the past few years to the development of exhaust gas pipes and/or apparatuses offering improved anti-pollution performance. However, the development of exhaust gas pipes, in particular for motorcycles, offering adequate performance and efficiency in terms of quantity of pollutants captured and trapped, but still complying with other requirements relating to motorcycles, in particular to motorbikes, such as, for instance, the overall layout, look and appearance, aerodynamics or the like, has revealed to be quite a difficult and challenging task. One of the requirements to be accomplished by an exhaust gas purifying apparatus relates to the activation temperature of the catalysts, namely, the temperature range within which adequate performances in terms of pollutants captured and/or trapped is possible.

In turn, the activation temperature depends on the location of the one or more catalysts. This in particular is due to the fact that the temperature of the catalysts may be influenced by the heat generated by the main engine and dissipated to the outside. Accordingly, placing the catalysts too close to the main engine, in particular too close to the combustion chamber, may result in the catalysts becoming overheated and reaching a temperature higher than the proper activation temperature. Also, this overheating may result in the catalysts not working properly.

A further requirement to be taken into account relates to the fact that the position and disposition of the catalysts influence the overall appearance and dimension as well as the aerodynamic characteristics of the motorcycle. Common catalysts have a length usually between about 10 cm and about 35 cm. Thus, in cases in which at least two catalysts are used, at least two rectilinear portions of the main exhaust gas pipe having the same length or more, each adapted to receive one of the two catalysts, must be provided. Accordingly, even in those cases in which a unique catalyst is needed or used, finding a convenient location for a corresponding rectilinear portion of the main exhaust gas pipe to receive each catalyst (e.g., a catalyst receiving portion of the main pipe) presents a difficult but important challenge.

Moreover, even during assembly of the motorcycle, in particular, during assembly of the exhaust gas purifying apparatus, several problems may occur. In particular, the catalyst receiving portion has to be provided in one piece, and thus, it may become difficult to handle and assemble the catalyst receiving portion. In particular, it may become difficult to assemble the rectilinear portion and/or to introduce the rectilinear portion into spaces having reduced dimensions such as, for instance, into spaces between the engine and the tubes of the main frame as well as into small spaces defined by other components of the motorcycle. Usually, to facilitate the assembly operations, the main exhaust gas pipe includes several detachable portions connected to each other by corresponding joint members, and several portions provided with corresponding several joint members, which determine an appropriate shape for the main pipe. However, assembly is limited by the need to provide a catalyst receiving portion having a predefined length. As a result, if an adequate location is found for the catalyst receiving portion, detachable portions of the main pipe and corresponding joint members can be used along the rest of the main pipe, for instance, in those locations in which detachable portions of reduced length may help in determining an appropriate shape for the main pipe. Furthermore, in the case of special motorcycles, such as, for instance, off-road motorcycles, a predefined minimal distance or gap must be provided between the main exhaust gas pipe and the ground, otherwise the motorcycle cannot adequately be used for the purposes for which it is designed.

In an attempt to meet as many as possible of the criteria and/or requirements described above, several solutions relating in particular to exhaust gas pipes have been proposed in recent years by the manufacturers of motorcycles. For instance, solutions have been suggested in which the one or two catalysts are placed in an area in front of the engine. However, even if, on the one hand, it is possible with such a design to raise the activation temperature of the one or more catalysts within a short time after starting the engine, on the other hand, the problem arises that the resistance of the exhaust gas flow is increased, thus resulting in the output characteristics of the engine being negatively affected.

According to another known solution, the main exhaust gas pipe is allowed to pass along a side of the cylinder block or head, and to extend toward the rear of the motorcycle, with the one or two catalysts being positioned on the side of the cylinder block or head. However, even if it can be appreciated that according to this solution, the two catalysts are not placed too far away from the combustion chamber so that, on the one hand, the time for reaching the activation temperatures is not unduly increased, and on the other hand, other disadvantages arise, relating in particular to the design of the motorcycle. Moreover, the overall dimension of the motorcycle, in particular, in the width direction, is unduly decreased. Further improvements of this solution have been proposed, according to which the catalysts are placed very close to the combustion chamber so as to provide adequate clearance between the catalysts and the legs of the driver and/or passenger. However, as stated above, when this solution is adopted, the temperature of the catalyst may rise excessively, in particular beyond the allowed activation temperature.

A further solution relating to an exhaust gas apparatus for motorcycles is disclosed in, for example, Japanese Patent Application Laid Open Publication No. 2008-94161. According to this solution, an exhaust gas purifying apparatus includes an exhaust gas main pipe extending from the engine of a motorcycle and including a catalyst receiving portion rising upward and substantially vertically. In addition, the receiving portion is located outside, in the motorcycle width the direction, of a rear arm supporting the rear wheel of the motorcycle. However, even if this solution simplifies the assembly operation, it results in an undesirable increase in the transverse dimension of the motorcycle.

Therefore, it is clear from the above description that in spite of all the efforts made to date, the known solutions proposed in the past do not meet the essential requirements which have to be taken into consideration during the design of a motorcycle and an exhaust gas apparatus for a motorcycle. In particular, the proposed solutions do not meet the needs of an exhaust gas pipe offering good performance in terms of functionality and reliability of the catalysts, as well as the needs in terms of the overall look, aerodynamics and reduced dimensions of motorcycles.

SUMMARY OF THE INVENTION

Accordingly, in view of the above, preferred embodiments of the present invention provide an exhaust gas purifying apparatus for a motorcycle that overcomes the problems and/or drawbacks affecting prior art exhaust gas purifying apparatuses. In particular, preferred embodiments of the present invention provide a gas purifying apparatus having an improved layout to provide for a convenient location of a catalyst receiving portion of an exhaust gas main pipe without unduly increasing the overall dimensions of the motorcycle, particularly in a width direction.

In general terms, preferred embodiments of the present invention are based on the discovery that the problems affecting the prior art exhaust gas pipes and/or apparatus may be overcome by providing an exhaust gas apparatus including a main exhaust gas pipe with at least a portion that is shaped and adapted to receive a corresponding catalyst at a convenient location along the main exhaust gas pipe. A further discovery upon which preferred embodiments of the present invention are based relates to the fact that, if the catalyst is received in a corresponding catalyst receiving portion or a portion of the main exhaust gas pipe located in the area behind the engine (when viewed from the side, or beyond the engine when viewed from the front of the motorcycle), then the clearance between the catalyst and the cylinder block can be kept large enough to avoid the situation that the temperature of the catalyst increases beyond the allowed activation temperature. Moreover, a problem with the resistance of the exhaust gas flow increasing is avoided so that the output characteristics of the engine are not negatively affected.

Still a further discovery on which preferred embodiments of the present invention are based relates to the fact that, if the catalyst receiving portion of the exhaust main pipe is located behind the engine and in the space between the engine and the rear wheel of the motorcycle, then the overall dimension of the motorcycle, in particular, the overall width direction of the motorcycle can be adequately contained with evident advantages in terms of the improved look and appearance of the motorcycle, as well as in terms of reduced aerodynamic resistance. Moreover, further advantages are achieved when the catalyst receiving portion is located inside the space between the rear shock absorber (acting on the rear wheel) and the rear wheel of the motorcycle. In fact, in this case, the space below the seat of the motorcycle is adequately used.

Another important discovery upon which preferred embodiments of the present invention are based relates to the fact that, with the catalyst receiving portion located between the engine and the rear wheel (or even between the rear shock absorber and the rear wheel), the remaining portion of the exhaust gas main pipe extending between the engine and the catalyst receiving portion can be adequately shaped and arranged, so as to include as many sub portions as needed, with the sub portions being joined by joint members without any limitations relating to the minimal length of the sub portions. Accordingly, the exhaust gas main pipe extending between the engine and the catalyst receiving portion may be curved, bent or shaped so as to be located as close as needed to the engine or even between the engine and the tubes of the main frame of the motorcycle or even so as to occupy small spaces between the several components of the motorcycle. Significant advantages are therefore also obtained in terms of simplified assembly operations of the exhaust gas main pipe since the sub portions of reduced length can be assembled in sequence, with the main frame or even other components of the motorcycle, such as for instance, the engine, no longer present an obstacle or disturbing the assembly operations.

With the catalyst receiving portion located between the engine and the rear wheel or even between the rear shock absorber and the rear wheel, it is also possible to locate the muffler of the exhaust gas apparatus at least partially below or under the seat of the motorcycle and not on the side of the seat as is the case according to prior art solutions. This makes it possible to contain the overall dimensions, in particular, in the width direction, of the motorcycle. Moreover, the muffler can be fixed to the frame of the motorcycle with significant advantages in terms of improved stability of the muffler.

According to various preferred embodiments of the present invention, the problems identified above affecting the prior art exhaust gas purifying apparatus are overcome and eliminated.

According to still another preferred embodiment, a motorcycle according to one of the preferred embodiments of the present invention includes a substantially flat member located between the air cleaner and the catalyst receiving portion of the exhaust gas main pipe.

According to still another preferred embodiment, a muffler includes a lower portion and an upper portion joined together by welding to flange portions at peripheral edge portions of the upper and lower portions.

It is also preferable to arrange left and right covers of the muffler to cover left and right side surfaces of the muffler.

A heat shield may also be disposed between the muffler and the seat so as to prevent heat from being transmitted from the muffler to the seat.

According to various preferred embodiments of the present invention, the catalyst receiving portion of the exhaust gas main pipe of the exhaust gas purifying apparatus is located in the space between the engine and the rear wheel or even between the rear shock absorber and the rear wheel. It may be pointed out once again that the main advantages achieved by such preferred embodiments of the present invention relate to the fact that the overall dimensions of the motorcycle do not unduly increase, that the gas flow resistance does not negatively affect the output of the engine, that the activation temperature is still reached quickly, that the catalyst does not become overheated and that the assembly operations of the exhaust gas main pipe are simplified.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
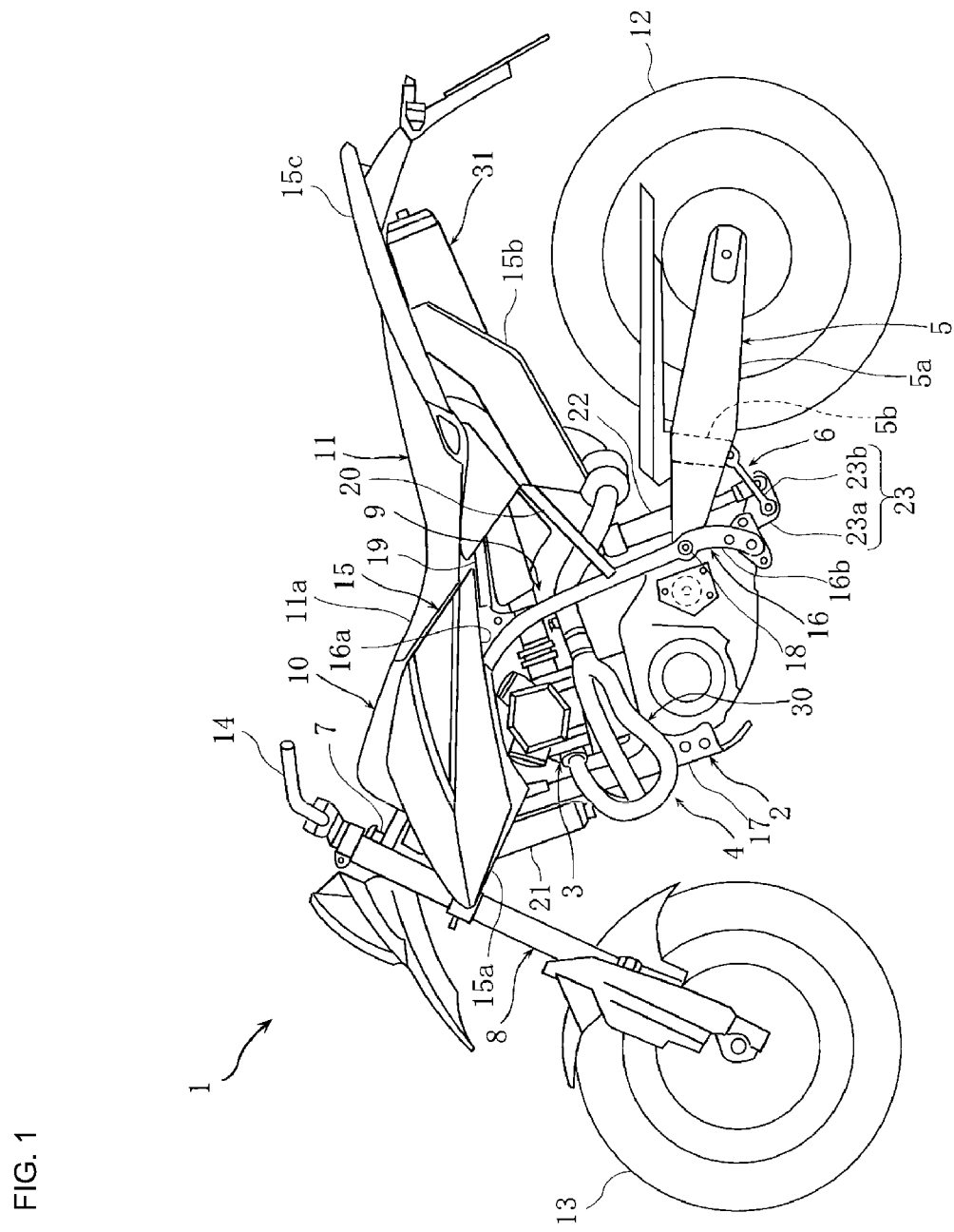
FIG. 1 is a side view from the left of a motorcycle according to a preferred embodiment of the present invention.

While the present invention is described with reference to the preferred embodiments as explained in the following detailed description and illustrated in the drawings, it should be understood that the following detailed description as well as the drawings are not intended to limit the scope of the present invention to the particular illustrated preferred embodiments disclosed and/or depicted therein, but rather that the described and illustrated preferred embodiments merely exemplify the various aspects and features of the present invention, the scope of which is defined only by the appended claims.

Preferred embodiments of the present invention are of particular advantage when applied to two wheeled motorcycles, such as, for instance, motorbikes. For this reason, examples will be given in the following, in which corresponding preferred embodiments of the exhaust gas purifying apparatus according to the present invention are preferably applied to motorcycles. However, applications of the exhaust gas purifying apparatus according to various preferred embodiments of the present invention are not limited to the case of motorbikes. On the contrary, the exhaust gas purifying apparatus according to preferred embodiments of the present invention may also be applied to other motorcycles, in particular, to three or even four wheeled motorcycles such as, for instance, choppers, quads or the like.

In the following, some details and features of the exhaust gas purifying apparatus or system according to various preferred embodiments of the present invention will be described with reference to the drawings wherein corresponding or equivalent features are identified by corresponding reference numerals. Moreover, in both the drawings and the following disclosure, terms such as, for instance, front, rear, left and right have to be understood as meaning respectively front, rear, left and right as used from the perspective of the person sitting on the motorcycle according to various preferred embodiments of the present invention. Moreover, in the following description, two identical reference numerals are used for identifying "left and right" component elements, even if only one of the two component elements is depicted in the drawings. For instance, if the description refers to a right and a left cover, with only the left cover being depicted in the drawings, the left and right covers are identified by indicating the same reference numerals twice; in the same way, when the description refers to a component element identified by two identical reference numerals (for instance, 19, 19), the description is to be understood as meaning that left and right component elements are provided.

In the drawings, reference numeral 1 indicates a motorcycle including an exhaust gas purifying apparatus according to a preferred embodiment of the present invention. The motorcycle 1 preferably is, for example, an off-road motorcycle. However, the exhaust gas purifying apparatus according to a preferred embodiment of the present invention is not limited to the application to only off-road motorcycles but may be included in any type of motorcycle or other vehicle.

The motorcycle 1 preferably includes a body frame 2, an engine 3 mounted on the body frame 2, an exhaust gas system 4 extending from the engine 3 and an air intake system 9 connected to the engine 3.

The motorcycle 1 also includes rear arms 5, 5 pivotally connected to the body frame 2 and rotatably supporting a rear wheel 12 on a rear end portion thereof; a rear wheel suspension system 6 is disposed between the rear arms 5 and the body frame 2.

Moreover, the motorcycle 1 includes a front fork 8 supported by a head pipe 7 to be steered leftward and rightward. The head pipe 7 is positioned at a front end portion of the body frame 2. A fuel tank 10 is mounted at the front end portion of the body frame 2, and a seat 11 is mounted behind the fuel tank 10.

A front wheel 13 is rotatably supported on lower end portions of the front fork 8 and a steering handlebar 14 is fixed to an upper end portion of the front fork 8.

The motorcycle 1 also includes an exterior cover 15 covering a substantial portion of the vehicle body. The exterior cover 15 includes left and right front side covers 15a, 15a covering a front portion of the main frame 2 along with left and right side surfaces of the fuel tank 10. The left and right covers 15a, 15a are preferably arranged to function as an air scoop to guide air so as to flow against the engine 3. Left and right rear side covers 15b, 15b cover a lower portion of the seat 11, whilst a rear cover 15c is arranged so as to be adjacent or contiguous to the left and right rear side covers 15b so as to cover a rear upper portion of the seat 11.

The body frame 2 (in the following also referred to as a main frame) includes the head pipe 7, left and right main tubes 16, 16 extending rearward and diagonally downward from an upper portion of the head pipe 7 while extending apart outward in a vehicle width direction, along with a down tube 17 extending substantially linearly, downward, and rearward, from a lower portion of the head pipe 7.

The left and right main tubes 16, 16 include tank rail portions 16a, 16a respectively, supporting the fuel tank 10 and rear-arm bracket portions 16b, 16b respectively, to which front end portions of the rear arms 5 are pivotally connected by a pivot shaft 18. A radiator 21 is mounted on a front portion of the down tube 17.

Moreover, the main frame 2 includes left and right seat rails 19, 19 extending rearward and substantially linearly from rear end portions of the left and right tank rail portions 16a, 16a, along with left and right seat tubes 20, 20 connecting midway portions of the left and right rear-arm bracket portions 16b, 16b and rear portions of the seat rails 19, 19.

The seat 11 is detachably mounted on the left and right seat rails 19, 19. A front portion 11a of the seat 11 is arranged so as to extend to cover an upper surface of a rear portion of the fuel tank 10.

The rear arms 5, 5 include left and right arm portions 5a, 5a extending in a front-to-back direction and a cross portion 5b connecting midway portions of the left and right arm portions 5a, 5a.

The rear wheel suspension system 6 includes a shock absorber 22 and a linkage mechanism 23. The shock absorber 22 is located in the space which is defined, in the width direction of the motorcycle 1, by the left and right arm portions 5a, 5a, in the front-to-back direction of the motorcycle, by the pivot shaft 18 and by the cross portion 5b which extends in the width direction and connects left and right arm portions 5a, 5a. Moreover, the shock absorber 22 is located substantially at the center of this space in the vehicle width direction. As apparent, in particular from FIGS. 2 and 3, the shock absorber 22 is located close to the rear-arm bracket portions 16b, 16b of the left and right main tubes 16, 16 and extends substantially parallel to the rear-arm bracket portions 16b, 16b. That is, the shock absorber is inclined forward in the counterclockwise direction with the upper portion of the shock absorber being inclined toward the front of the motorcycle as viewed from a lateral side of the vehicle. Although a shock absorber 22 including a coil spring 22a preferably has been depicted in the drawings, different shock absorbers (for instance, hydraulic or pneumatic shock absorbers) can be used and/or implemented according to various preferred embodiments of the present invention.

The linkage mechanism 23 preferably includes a triangular first link 23a connected to the lower end portions of the left and right rear-arm bracket portions 16b, 16b, and a rod-shaped second link 23b connecting the first link 23a and the cross portion 5b which connects the rear arms 5, 5. The lower end portion of the shock absorber 22 is connected to the first link 23a and the upper end portion of the shock absorber 22 is connected to a bridge portion interposed between the left and right rear-arm bracket portions 16b, 16b.

Figure 2:
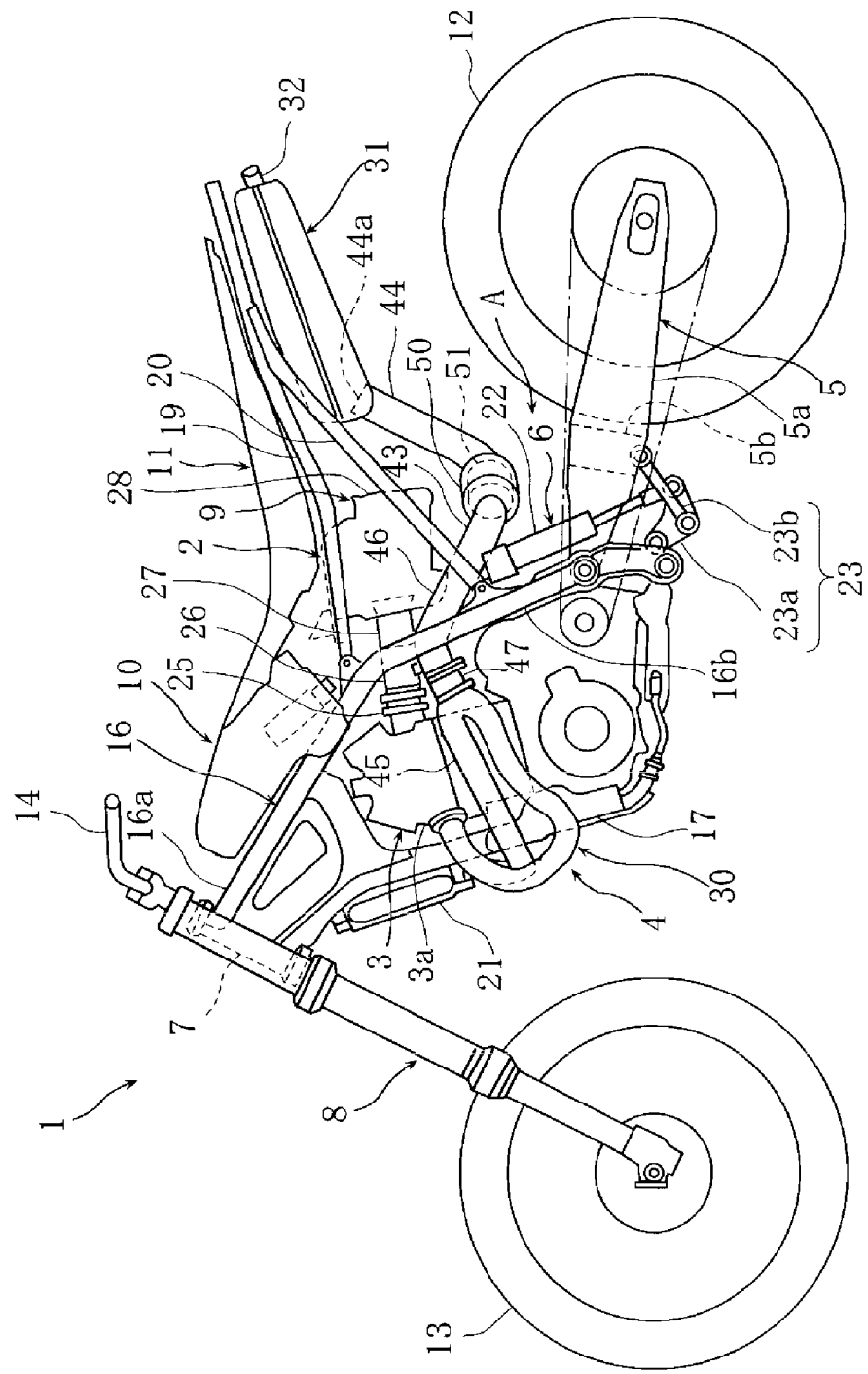
FIG. 2 is a further side view of the motorcycle of FIG. 1 depicting in detail the main frame of the motorcycle and an engine mounted on the body frame.
Figure 3:
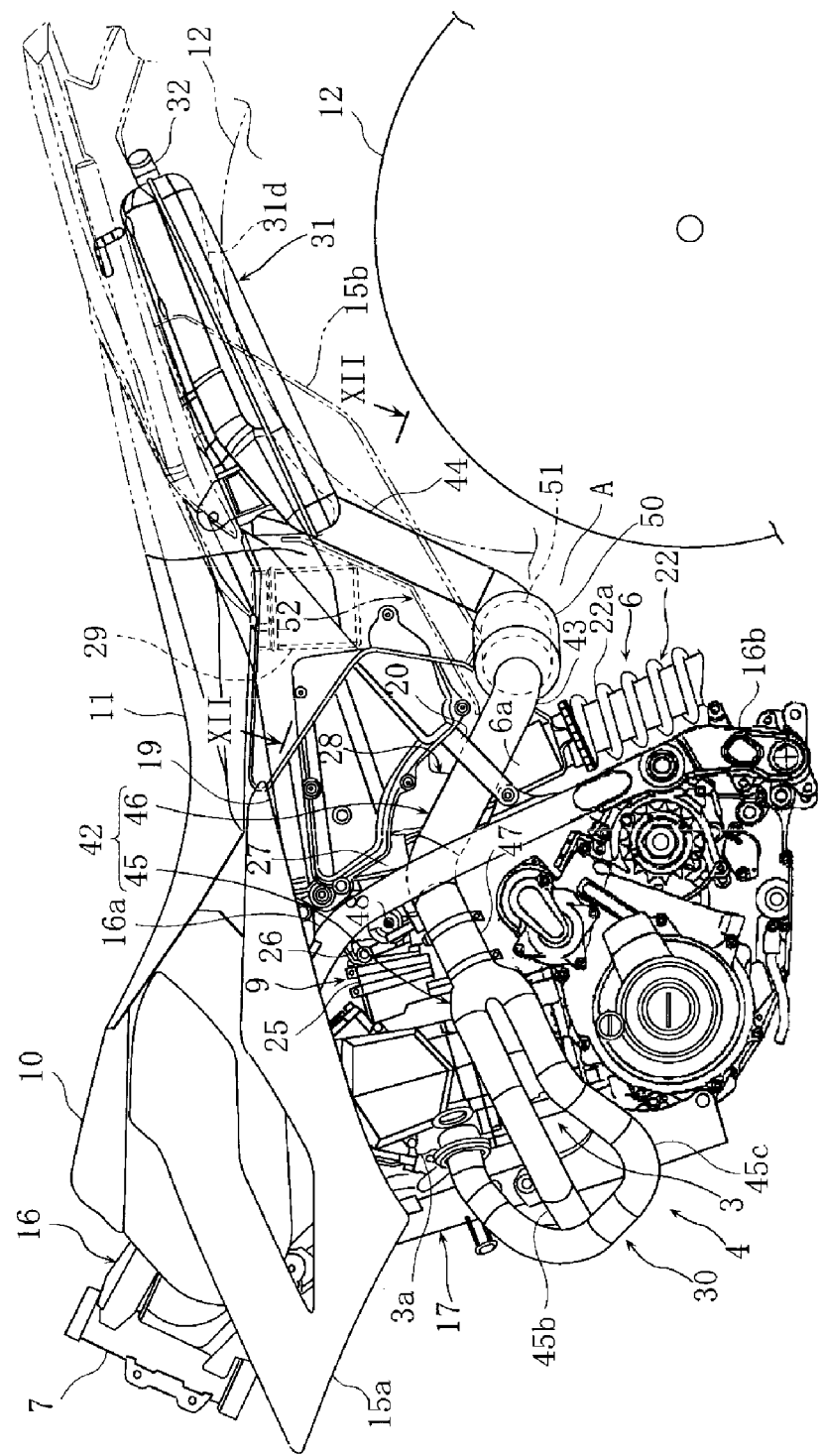
FIG. 3 is a side view of an exhaust gas system connected to the engine.

Still with reference to FIGS. 1 to 3, the engine 3 is preferably located between the left and right main tubes 16, 16 and the down tube 17. For instance, the engine may be a water-cooled-4-cycle single-cylinder engine. However, within the scope of the present invention, other engines can be used, such as, for instance, multiple-cylinder engines and/or air-cooled engines.

The motorcycle also includes an air intake system 9 connected to a rear wall of the cylinder head 3a of the engine 3. The air intake system 9 includes a throttle body 26 connected to an intake port open in the rear wall of the cylinder head 3a by a joint member 25 and an air cleaner 28 is connected to the throttle body 26 by an intake duct 27.

The air cleaner 28 is located below or under the seat 11, the upper portion of the air cleaner 28 being located between the left and right seat rails 19, 19. A battery 29 is disposed below or under the seat 11 and behind the air cleaner 28.

In the following, with reference to FIGS. 4 to 12, further details and features of the exhaust gas system according to a preferred embodiment of the present invention will be described. In FIGS. 4 to 12, those features already described above with reference to previous figures are identified by the same reference numerals.

Figure 4:
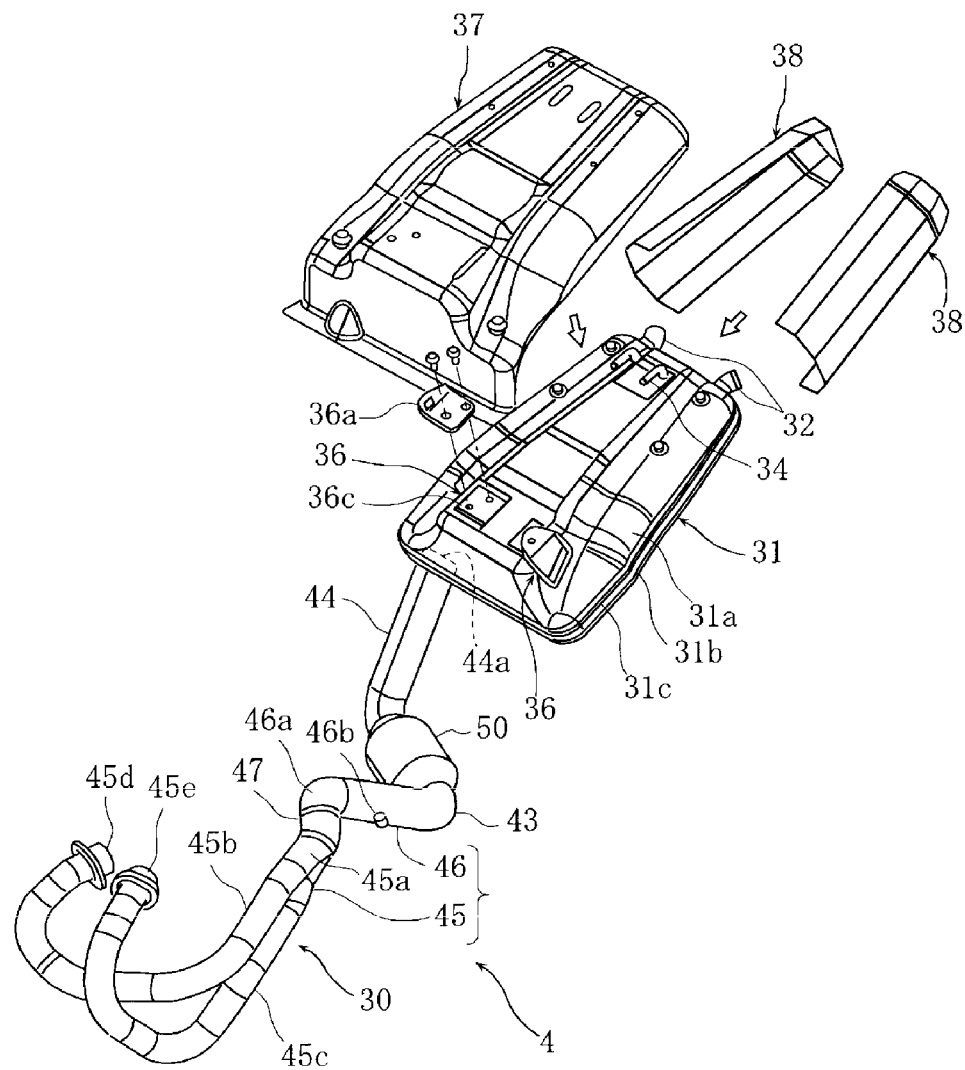
FIG. 4 is an exploded perspective view of the exhaust system.
Figure 5:
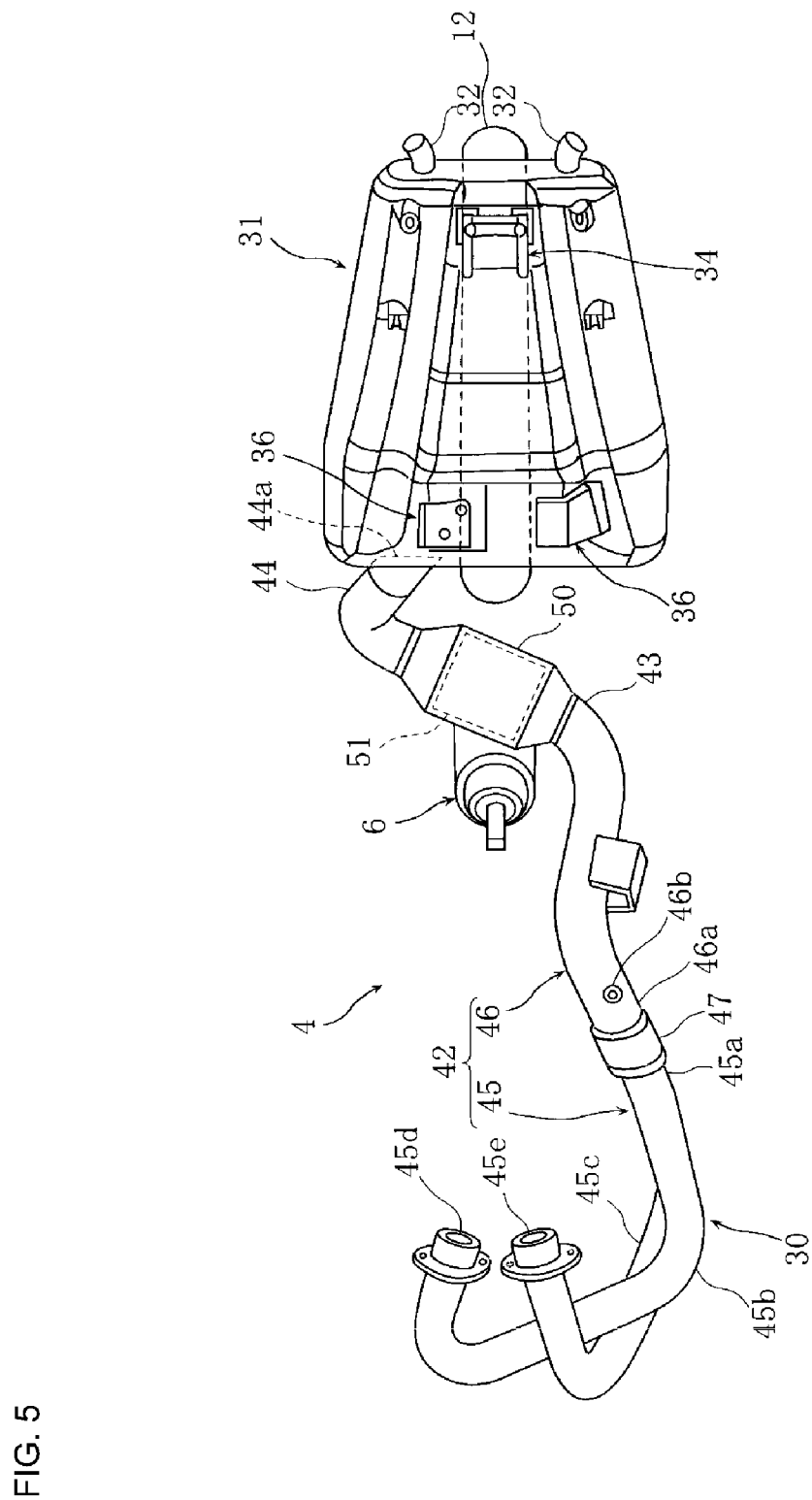
FIG. 5 is a top view of the exhaust system of FIG. 4.

As apparent in particular from FIGS. 4 to 5, the exhaust gas system 4 extends from a front wall of the cylinder head 3a of the engine 3. In particular, the exhaust gas system 4 includes an exhaust gas main pipe 30 connected to an exhaust gas port open in the front wall of the cylinder head 3a and a muffler 31 connected to a downstream end portion of the exhaust gas main pipe 30.

The muffler 31 is located substantially below or under a rear portion of the seat 11. Moreover, the muffler 31 preferably has a box shape and includes an upper member 31a and a lower member 31b joined together. For instance, the upper member 31a and the lower member 31b may be joined together by welding together flange portions 31c at peripheral edge portions of the members 31a and 31b. However, depending on the needs and/or circumstances, other solutions may be adopted for joining together the members 31a and 31b. For instance, screws, clips or the like may be used.

A pair of left and right tail pipes 32, 32 extend from the rear end wall of the muffler 31. The tail pipes 32, 32 preferably are slightly rotated or oriented so as to face diagonally outward in the vehicle width direction. A bottom portion of the lower member 31b of the muffler 31 includes a concave portion 31d arranged to avoid interference with an upper end portion of the rear wheel 12 during compression of the shock absorber 22.

Left and right covers 38, 38 are arranged to cover and protect left and right side surfaces of the muffler 31, respectively. A heat shield plate 37 is preferably arranged between the muffler 31 and the left and right covers 38. In this way, heat coming from the muffler 31 is prevented from being transmitted to the seat 11.

As apparent from FIGS. 4 to 8 and 10, the muffler 31 includes a support member 34 extending from the upper member 31a (from the upper surface thereof) so as to face upwards, along with fastening members 36, 36. The support member 34 is adapted to be inserted from behind into a rear support portion 33 fixed to the main frame 2. The fastening members 36, 36 are adapted to be fixed to left and right front support portions 35, 35, respectively, also belonging to the main frame 2. In particular, the muffler 31 is fixed to the main frame 2 as follows.

The rear support portion 33 includes an L-shaped support plate 33a (see in particular FIGS. 9 and 10) connected like a bridge between rear end portions of the left and right seat rails 19, 19. The rear support portion 33 includes left and right cylindrical grommets 33b, 33b connected to the support plate 33a (to the portion thereof extending upwards). In particular, the left and right grommets 33b are oriented so that their insertion holes 33c, 33c are oriented in the front-to-back direction of the motorcycle.

The support member 34 includes a base portion 34a fixed to a rear end portion of the upper member 31a of the muffler 31, along with left and right insertion portions 34b, 34b extending from the base portion 34a and being bent forward. The insertion portions 34b, 34b preferably are L-shaped, with a first portion extending substantially perpendicularly from the base portion 34a and a second portion extending substantially perpendicularly from the first portion and facing toward the front of the vehicle.

With respect to the left and right front support portions 35, 35, as shown in FIGS. 4 to 8 and 10, each of the left and right front support portions 35, 35 includes a bracket 35b, 35b connected like a bridge between the corresponding seat rail 19 and the seat stay 20 and extending in a substantially vertical direction. The left front support portion 35 extends therefore between the left seat rail 19 and the left seat stay 20 whereas the right front support portion 35 extends between the right seat rail 19 and the right seat stay 20. Moreover, each one of the left and right front support portions 35, 35 includes a cylindrical body 35a, 35a disposed with its axis oriented in the vehicle width direction. A collar 35d, 35d is inserted into the cylindrical body 35a, 35a of each of the left and right front support portions 35, 35 with a damper 35c, 35c interposed therebetween. Each of the left and right collars 35d, 35d is located between the corresponding seat rail 19 and the seat stay 20.

The left and right fastening members 36, 36 (see in particular FIGS. 7 and 8) include substantially L-shaped fastening plates 36a, 36a with a first portion thereof protruding upward and adapted to be fixed to the front support portions 35, 35 respectively, for example, by fastening bolts 36b, 36b, along with second portions fixed to left and right front end portions of the upper member 31a, 31a (of the upper surface thereof), respectively.

In particular, the right fastening plate 36a (see in particular FIGS. 8 and 11) is fixed, for example, by two bolts 40, 40, to a plate 36c mounted on the upper member 31a (on the upper surface thereof) with the heat shield plate 37 sandwiched therebetween. The assembly of the muffler 31 to the seat 11 is therefore carried out as follows.

The left and right insertion portions 34b, 34b of the support member 34, are inserted into the left and right cylindrical grommets 33b, 33b of the rear support portion 33, respectively. To this end, the muffler 31 is displaced toward the front of the vehicle. The heat shield plate 37 (see FIGS. 4 and 10) includes holes adapted to receive the left and right insertion portions 34b, 34b, respectively. In this way, the heat shield plate 37 is sandwiched between the muffler 31 and seat 11. As a result of the insertion of the left and right insertion portions 34b, 34b into the corresponding left and right cylindrical grommets 33b, 33b, the fastening members 36, 36 are brought into correspondence with the left and right front support portions 35, 35, respectively. In particular, the portions of the fastening plates 36a, 36a extending upward are brought into correspondence with the cylindrical bodies 35a, 35a (of the collars 35b received therein) so that it is possible to insert the fastening bolts 36b, 36b from outside into the collars 35d, 35d and into corresponding holes of the plates 36a, 36a so as to fix the plates 36a, 36a and therefore the muffler 31, to the collars 35d, 35d.

In the following, with reference to FIGS. 4 to 12, further details and/or features of the exhaust gas system according to a preferred embodiment of the present invention will be described. As usual, those details and/or features already described with reference to previous figures are identified by the same reference numbers.

Figure 6:
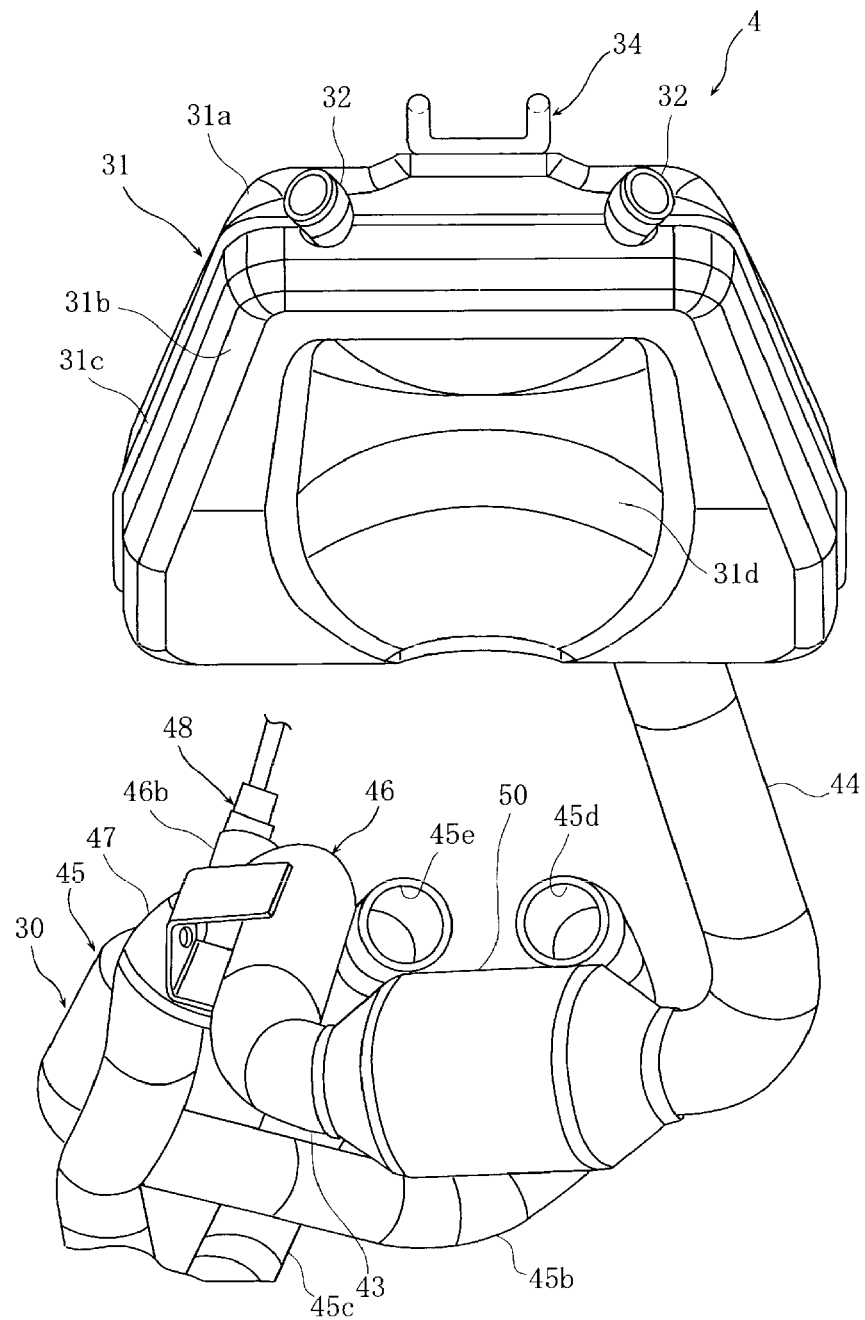
FIG. 6 is a back view of the exhaust system of FIGS. 4 and 5.
Figure 7:
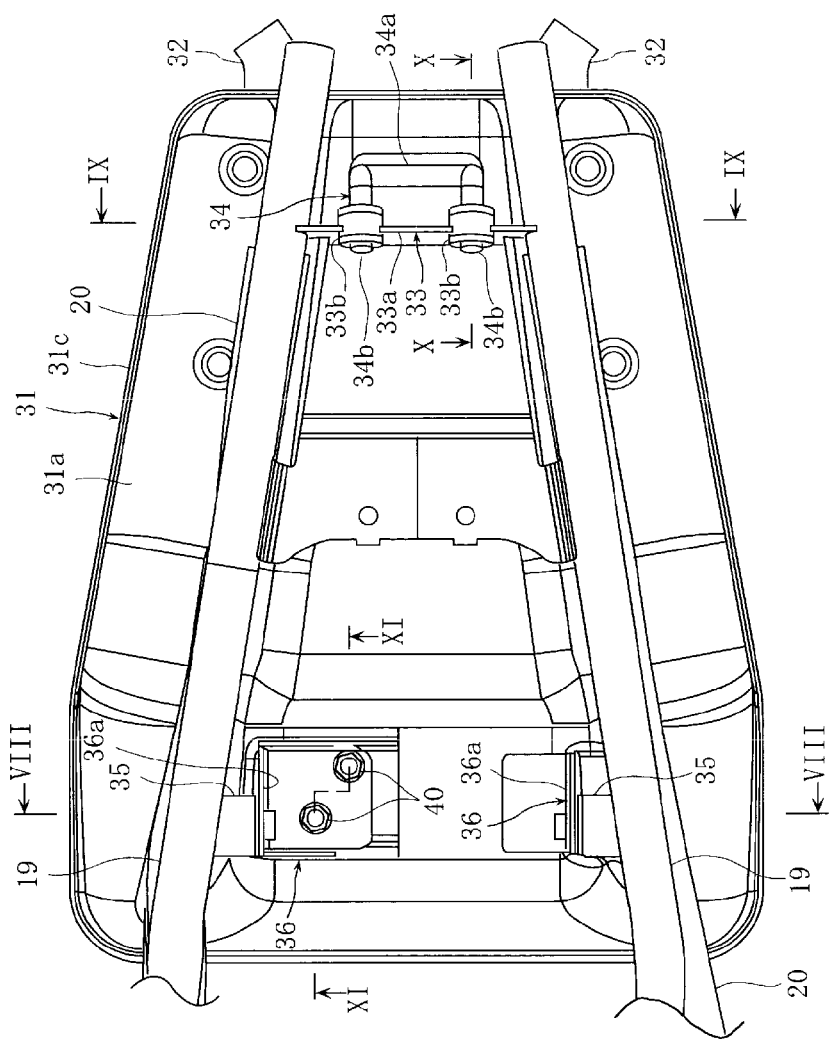
FIG. 7 is a top view of the muffler of the exhaust system of FIGS. 4 to 6.
Figure 8:
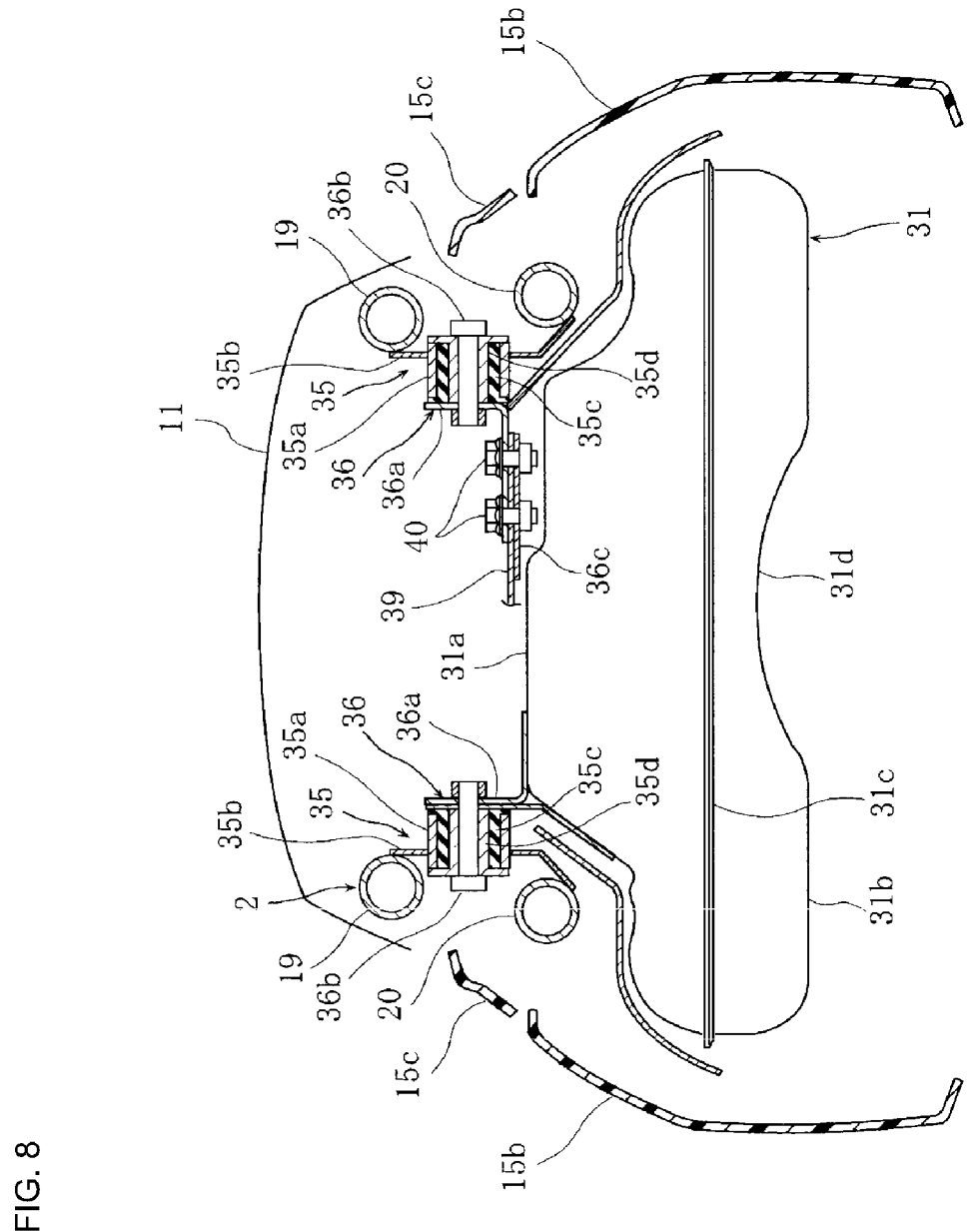
FIG. 8 is a cross-sectional view taken along a line VIII-VIII in FIG. 7 of a portion of the muffler of FIG. 7.
Figure 9:
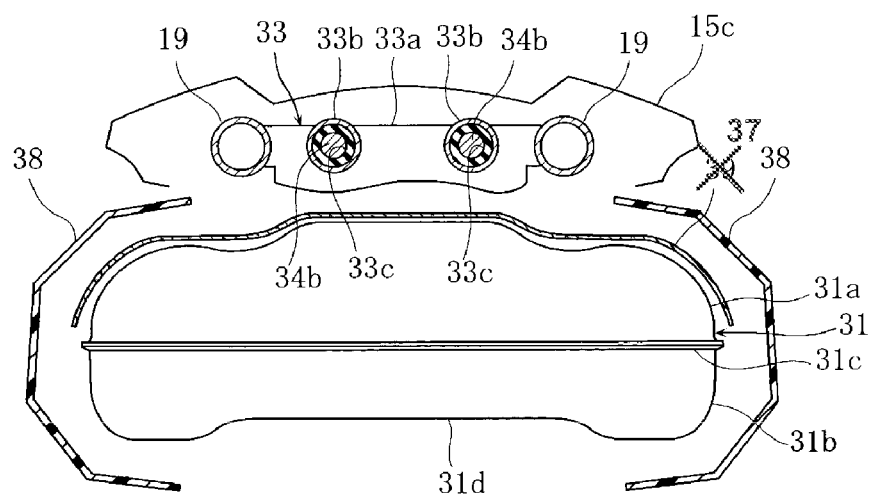
FIG. 9 is a cross-sectional view taken along a line IX-IX in FIG. 7 of the portion of the muffler of FIG. 7.
Figure 10:
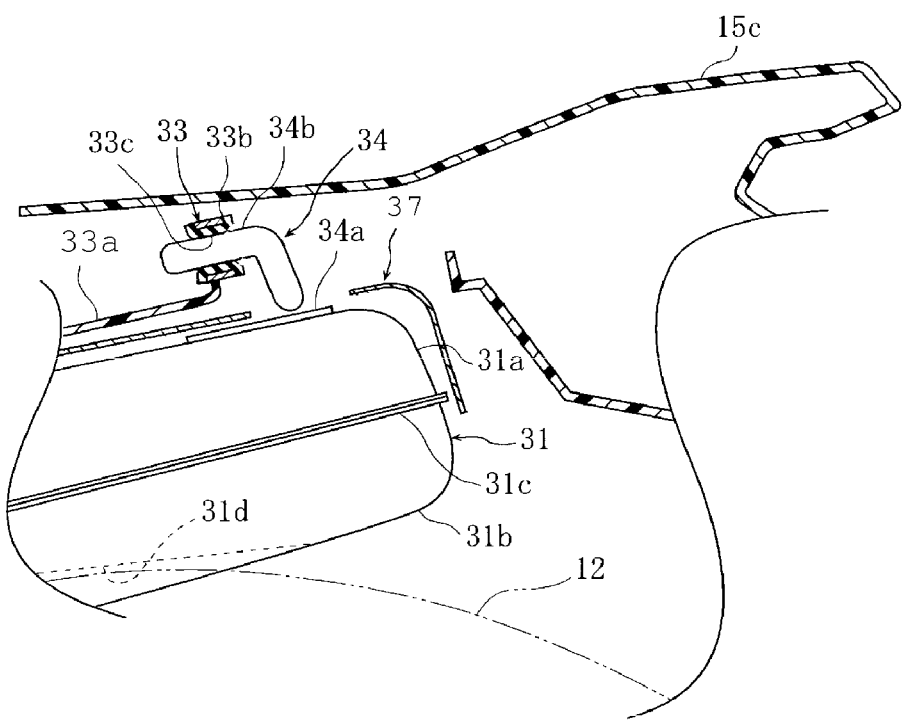
FIG. 10 is a cross-sectional view taken along a line X-X in FIG. 7 of the portion of the muffler of FIG. 7.
Figure 11:
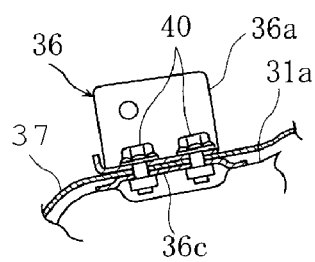
FIG. 11 is a cross-sectional view taken along a line XI-XI in FIG. 7 of the portion of the muffler of FIG. 7.
Figure 12:
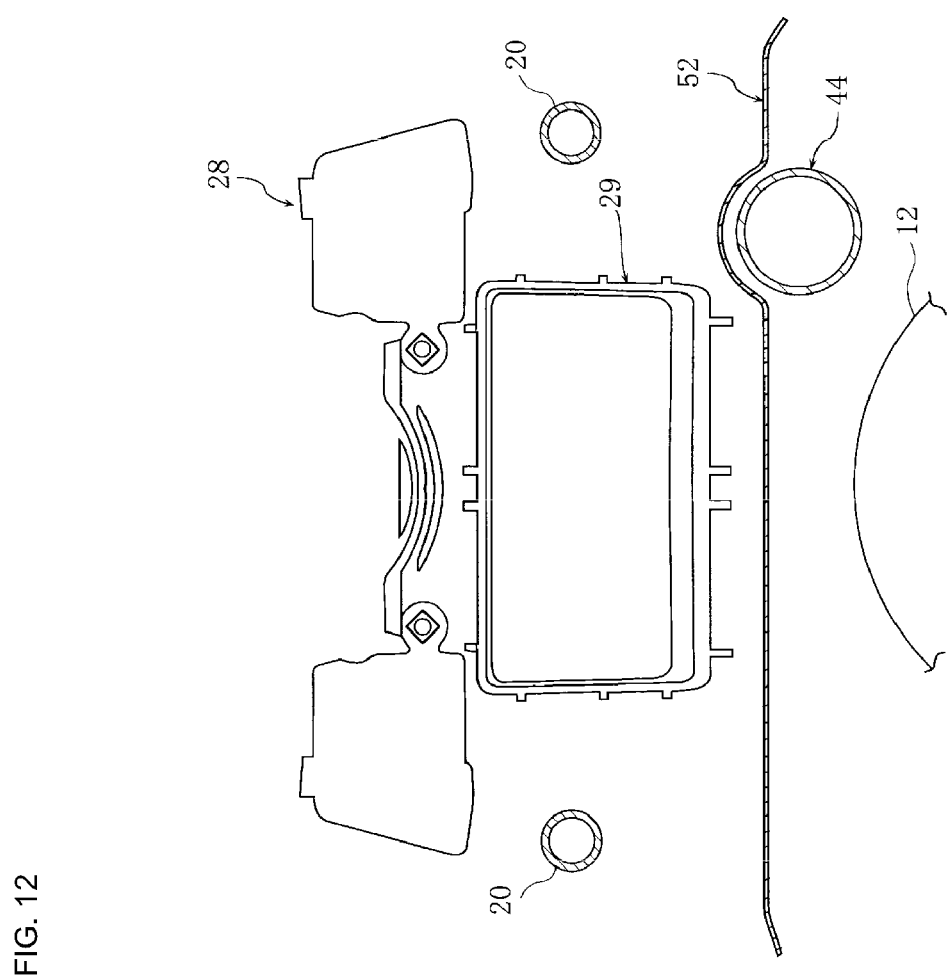
FIG. 12 is a cross-sectional view taken along a line XII-XII in FIG. 3 of an exhaust pipe of the exhaust system.

As apparent in particular from FIGS. 4 to 6, the exhaust gas main pipe 30 preferably includes a front-to-back extending portion 42 extending in the front-to-back direction on the left side of the engine 3. The exhaust gas main pipe 30 preferably includes a vehicle-width extending portion 43 extending from a downstream end portion of the front-to-back extending portion 42 toward the right side (the opposite side) in the vehicle width direction. Moreover, the exhaust main pipe 30 preferably includes an upward extending portion 44 extending upward and slightly rearward from a downstream end portion of the vehicle-width extending portion 43.

The front-to-back extending portion 42 includes a front portion 45 and a rear portion 46, the rear portion 46 being located substantially behind the engine 3 (on the right thereof when viewed from the left of the motorcycle). A rear end portion 45a of the front portion 45 and a front end portion 46a of the rear portion 46 are detachably connected by a joint member 47.

The rear portion 46 extends from the joint member 47 and extends through inside the left rear-arm bracket portion 16b to extend rearward and downward between an upper portion of the shock absorber 22 and the left seat stay 20 (see FIG. 3).

A portion of the rear portion 46 arranged downstream from and close to the joint member 47 includes an attachment hole 46b open upward and an oxygen sensor 48 arranged to detect an oxygen concentration in the exhaust gas is attached to the attachment hole 46b.

The oxygen sensor 48 is located substantially in front of the left rear-arm bracket portions 16b of the main left tube 16 and behind the cylinder head 3a to overlap with the throttle body 26 as viewed from a lateral side of the vehicle. In this way, the oxygen sensor 48 is located in such a position that it can be seen from a lateral side of the vehicle, can be maintained without interfering with the left main tube 16, and is less likely to be affected by heat coming from the engine 3.

The front portion 45 includes an upper first exhaust pipe portion 45b and a lower second exhaust pipe portion 45c joined together at their rear end portions 45a.

The first exhaust pipe portion 45b extends substantially linearly forward and downward from the join portion 45a and bends to surround a front portion of the down tube 17 of the main frame 2.

The second exhaust pipe portion 45c extends forward and downward from the join portion 45a and bends upward to form a substantially semicircular shape on the left side of the down tube 17.

Upstream ports 45d, 45e of the first and second exhaust pipe portions 45b, 45c are connected to the front wall of the cylinder head 3a. Exhaust ports open on the front wall are preferably defined by dividing one exhaust opening formed in the cylinder head 3a into two and leading them out. The first and second exhaust pipe portions 45b, 45c are connected to the respective exhaust ports.

The vehicle-width extending portion 43 extending from the rear portion 46 runs through a space A defined by the engine 3, in particular, by the shock absorber 22 and the rear wheel 12. For example, the vehicle-width extending portion 43 extends rightward in the vehicle width direction. In particular, the vehicle-width extending portion 43 is located or received in the space A defined and/or limited by the engine 3 or even the shock absorber 22 and the rear wheel 12 in the front back direction, by the rear arms 5 in the width direction and by the rear arms 5 and the air cleaner 28 in the upward direction.

The vehicle-width extending portion 43 extends substantially horizontally in the vehicle width direction and extends diagonally rearward as viewed from above the vehicle. Arranged along the vehicle-width extending portion 43 substantially at the center thereof are a catalyst receiving portion 50 having a larger diameter than the vehicle-width extending portion 43, and a catalyst 51 arranged to purify exhaust gas received in the catalyst receiving portion 50.

The catalyst receiving portion 50 is arranged so as to overlap with the shock absorber 22 and more specifically, with a lower half portion of the shock absorber 22 as viewed from above the vehicle (see FIG. 3).

The catalyst receiving portion 50 is substantially in the same vertical position as an upper portion 6a of the shock absorber 22 and more specifically in a higher vertical position than a coil spring 22a of the shock absorber body 22 (see FIG. 3).

A substantially flat member 52 having a heat-shielding function is disposed between the catalyst receiving portion 50 and the air cleaner 28. The substantially flat member 52 is preferably wide enough to cover the vehicle-width extending portion 43 and the upward extending portion 44 and extends upward to be positioned between the upward extending portion 44 and the battery 29 (see FIGS. 3 and 12).

The upward extending portion 44 contiguous to the vehicle-width extending portion 43 extends rearward, diagonally upward, and linearly between the shock absorber 22 and the rear wheel 12 in the space A and behind the battery 29. A downstream port 44a of the upward extending portion 44 is connected to a right end portion in the vehicle width direction of a front wall portion of the muffler 31.

Thus, according to the present preferred embodiment of the present invention, once the exhaust gas system has been mounted on the motorcycle 1, the catalyst receiving portion 50 (inside of which the catalyst 51 is received) of the exhaust main pipe 30 is located substantially in correspondence with the vertical plane of symmetry of the motorcycle with portions of the catalyst receiving portion 50 located on opposite sides of the plane of symmetry. Moreover, the catalyst receiving portion 50 it located in a space defined, in the front-to-back or longitudinal direction of the motorcycle, by the engine (or even by the rear shock absorber 22) and the rear wheel 12 of the motorcycle. With the catalyst 51 received inside the catalyst receiving portion 50, both the catalyst receiving portion 50 and the catalyst 51 can be conveniently located so that at least two relevant needs are met: on the one hand, the space A between the engine and the rear wheel, which is usually empty or wherein usually no components of the motorcycle are conventionally disposed is conveniently and effectively used; and the dimensions of the motorcycle in the width direction are not unduly increased. Moreover, with the vehicle-width extending portion 43 of the main pipe 30 located in the space A defined by the engine 3 and the rear wheel 12 so as to extend from the left side (one side) to the right side (the opposite side) and in particular with a catalyst 51 received in a catalyst receiving portion 50 of the vehicle-width extending portion 43, further advantages in terms of improved performance of the catalyst 51 are obtained. In fact, the catalyst does not get overheated due to the heat generated by the engine (the catalyst can work at the activation temperature) and the resistance of the exhaust gas flow is not unduly increased so that the output characteristics of the engine are not negatively affected. Moreover, with the vehicle-width extending portion 43 extending substantially horizontally and diagonally rearward and in particular with the catalyst 51 received in the catalyst receiving portion 50 of the vehicle-width extending portion, the space A between the engine 3 and the rear wheel 12 is effectively utilized. In particular, this space A is not entirely occupied by the vehicle-width extending portion 43 and the catalyst receiving portion 50 so that the assembly operations of the exhaust gas system are simplified and sped up with corresponding advantages in terms of reduced assembly costs.

Moreover, the substantially flat member 52 defining the heat shield plate can be disposed between the air cleaner 28 located above the catalyst receiving portion 50 and the catalyst housing portion 50. Therefore, even if the air cleaner 28 is disposed above the catalyst 51, the clearance between the air cleaner 28 and the catalyst 51 may be maintained as small as possible without any risk of the air cleaner becoming overheated due to the heat emitted by the catalyst 51. As a result, even restrictions as to the position of the seat 11 mounted above the air cleaner 28 are overcome. Therefore, it is possible to meet a design request to provide a substantially horizontal line from the fuel tank 10 to the seat 11. Furthermore, a bottom surface of the air cleaner 28 can be brought close to the catalyst 51 and it is possible to secure a necessary capacity of the air cleaner 28 without increasing a height of the seat.

According to a further preferred embodiment, an upward extending portion 44 extending rearward and diagonally upward from the vehicle-width extending portion 43 and connected to the muffler 31 is preferably provided. Therefore, it is possible to secure a necessary length of the exhaust pipe.

According to a further preferred embodiment, the muffler 31 is supported by the body frame 2 via the support member 34 inserted in the vehicle front-to-back direction into the rear support portion 33 belonging to the body frame 2 and the fastening members 36 fastened in the vehicle width direction to the front support portions 35 also belonging to the body frame 2. Therefore, simply inserting the support member 34 forward from behind and fastening the support member 34 with the fastening members 36 from outside in the vehicle width direction is all that is required for mounting the muffler 31, thereby facilitating mounting of the muffler 31 on the body frame 2.

The exhaust pipe 30 preferably includes a front-to-back extending portion 42 extending in the vehicle front-to-back direction on the left side of the engine 3 with the front-to-back extending portion 42 also including front and rear portions. Therefore, the exhaust pipe 30 can be mounted in the same direction as the direction in which the muffler 31 is inserted, which facilitates mounting the exhaust pipe 30.

Moreover, since the catalyst housing portion 50 is arranged to overlap with the shock absorber 22 inclined forward as viewed from above the vehicle, it is possible to arrange the catalyst housing portion 50 in a space-saving manner. In this case, by disposing the catalyst housing portion 50 on the front side of the vehicle in the space A, it is possible to displace the rear wheel 12 forward to thereby shorten a wheel base.

Thus, preferred embodiments of the present invention overcome the problems with prior art gas systems. In particular, with various preferred embodiments of the present invention, significant advantages in terms of improved functionality of the catalyst as well as in terms of contained dimensions and improved overall look and appearance as well as aerodynamics of the motorcycle are obtained.

While the present invention has been described with reference to the particular preferred embodiments depicted in the drawings, it is to be understood that the present invention is not limited to the particular preferred embodiments described herein. For instance, while the preferred embodiments of the present invention have been described above according to which the vehicle-width extending portion 43 of the exhaust main pipe is preferably located in the space A between the engine 3 and the rear wheel 12 (or even between the rear shock absorber and the rear wheel 12) so as to extend substantially horizontally, with the vehicle-width extending portion 43 including the catalyst receiving portion 50, it should be noted that the present invention also encompasses a preferred embodiment in which the catalyst receiving portion 50 extends substantially vertically. In this case, further advantages in terms of contained or reduced dimension of the vehicle body (in particular in the vehicle width direction) are obtained.

Moreover, a preferred embodiment of the present invention preferably includes a main pipe 4 (in particular, the front and back portions 45, 46 thereof) extending from the engine along the left side of the engine, with the vehicle-width extending portion 43 and/or the catalyst receiving portion 50 extending from the left side to the right side. However, a preferred embodiment of the present invention may also have a structure in which the main pipe 4 extends from the engine 3 on the right side thereof. In this case, the vehicle-width extending portion 43 and the catalyst receiving portion 50 extend from the right side to the left side.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motorcycle comprising:
   a body frame;
   an engine supported by the body frame;
   an exhaust gas system including an exhaust gas main pipe extending from the engine and a muffler connected to the exhaust gas main pipe, the exhaust gas main pipe including a front-to-back extending portion extending in a front-to-back direction of the motorcycle on a side of the engine;
   a rear wheel located behind the engine in the front-to-back direction; and
   a rear arm pivotally connected to the body frame and including a rear end portion on which the rear wheel is supported, and a shock absorber disposed between the rear arm and the body frame; wherein the exhaust gas main pipe includes a catalyst receiving portion extending in the front-to-back extending portion and located in a space defined in the front-to-back direction by the shock absorber and the rear wheel, the space being limited at a bottom by the rear arm, and the catalyst receiving portion includes a catalyst therein; and the exhaust gas main pipe includes a vehicle-width extending portion extending from a first side to a second side of the motorcycle in a width direction of the motorcycle through a space between the engine and the rear wheel, the catalyst receiving portion being provided in the vehicle-width extending portion.

2. A motorcycle according to claim 1, wherein the front-to-back extending portion includes a front portion and a rear portion joined to each other by a joint member.

3. A motorcycle according to claim 1, wherein the vehicle-width extending portion extends from the first side to the second side of the motorcycle substantially horizontally and diagonally.

4. A motorcycle as claimed in claim 1, wherein the motorcycle further comprises a seat mounted on the body frame, an air cleaner located below the seat and above the catalyst receiving portion, and a substantially flat member disposed between the air cleaner and the catalyst receiving portion.

5. A motorcycle according to claim 4, wherein the muffler is located below a rear portion of the seat, and the exhaust gas main pipe further includes a portion extending rearward and diagonally upward from the vehicle-width extending portion to the muffler.

6. A motorcycle according claim 1, wherein the muffler includes a support member arranged to be inserted in the front-to-back direction into a support portion of the main frame.

7. A motorcycle as claimed in claim 6, wherein the muffler further includes fastening members arranged to be fastened in the vehicle width direction to support portions of the body frame.

8. A motorcycle according to claim 1, wherein the catalyst receiving portion at least partially overlaps with the shock absorber as viewed from above the motorcycle.

* * * * *